United States Patent [19]

Nakajima

[11] Patent Number: 5,118,132
[45] Date of Patent: Jun. 2, 1992

[54] COVER OF AN AIR BAG DEVICE
[75] Inventor: Hideo Nakajima, Shiga, Japan
[73] Assignee: Takata Corporation, Tokyo, Japan
[21] Appl. No.: 610,116
[22] Filed: Nov. 7, 1990
[30] Foreign Application Priority Data Dec. 14, 1989 [JP] Japan .................. 1-324413

[51] Int. Cl.⁵ .............................................. B60R 21/16
[52] U.S. Cl. .................................... 280/728; 280/731
[58] Field of Search ................. 280/728, 731, 732, 743

[56] References Cited
U.S. PATENT DOCUMENTS

| | | | |
|---|---|---|---|
| 4,097,064 | 6/1978 | Ikawa et al. | 280/732 |
| 4,810,005 | 3/1989 | Föhl | 280/732 |
| 4,834,421 | 5/1989 | Körber et al. | 280/743 |
| 4,852,907 | 8/1989 | Shiraki et al. | 280/731 |
| 4,878,689 | 11/1989 | Mitzkus et al. | 280/731 |

FOREIGN PATENT DOCUMENTS 2520238  7/1983  France ............................ 280/728
63-188257 12/1988 Japan .

Primary Examiner—Charles A. Marmor
Assistant Examiner—Tamara L. Graysay
Attorney, Agent, or Firm—Kanesaka and Takeuchi

[57] ABSTRACT

A cover for an air bag device in which a net body for reinforcement is buried characterized in that a bar-like body or a board-like body existing along the peripheral edge portion of said cover is buried in said cover and the edge portion of said net body completely covers the bar-like body or the board-like body.

7 Claims, 3 Drawing Sheets

COVER OF AN AIR BAG DEVICE

FIELD OF THE INVENTION AND RELATED ART STATEMENT

The present invention relates to a cover of an air bag device which protect an occupant of a vehicle in case of a collision of the vehicle, etc., and more particularly, to such a cover which is reinforced by a net body buried therein.

An air bag device has, as is known well, an air bag which is rapidly expanded in an emergency such as a collision of the vehicle. In a normal time, the air bag is folded and covered with a cover. The air bag is supported by an attaching board, for example, one named as a retainer. The cover is fixed to the attaching board by rivets, screws or bolts.

A cover of an air bag device of a type attached to a steering wheel of a vehicle is a bottomless, box-like cover with a lid having side wall portions and a canopy portion. Also, a cover with its side wall portions and a canopy portion reinforced by a net body is used.

The cover is provided with a line along which tearing begins (a tear line). The portion of the tear line is a portion of less strength compared with the surrounding portion and provided in a predetermined linear form. When the air bag is expanded, the cover is torn along the tear line.

When the cover is torn, considerably great tensile force acts on the cover. Therefore, a net body is buried in the cover to give necessary tensile strength to the portion of the cover except the tear line of the cover.

When the cover is torn, a great tensile load is added to the cover outwardly from the attaching board such as the retainer, and stress concentrates on through hole portions for attaching the cover for such as rivets, bolts, etc. Accordingly, a cover has been proposed in which a synthetic resin board is buried at the side wall portions and a net body is sewed on the synthetic resin board so that the tensile load may be dispersed all over the side wall portions (Japanese laid-open Utility application No. SHO 63-188257).

However, a cover with a synthetic resin board buried in its side wall portions has a problem that the side wall portions are difficult to be opened outward and to be deformed because of the high flexural rigidity of the side wall portions.

OBJECT AND SUMMARY OF THE INVENTION

The object of the present invention is to provide a cover of an air bag device which cover is firmly supported by a retainer, is not required to be excessively reinforced, and is deformed so as to be opened promptly when the air bag is expanded. When the cover is torn, force is dispersed over a bar-like body or a board-like body.

A cover of an air bag apparatus of the present invention is characterized in that a bar-like body or a board-like body is buried in the cover along the peripheral edge portion of the cover and a net body completely covers the bar-like body or the board-like body.

A cover of the present invention is fixed to an attaching board such as a retainer by, for example, rivets, bolts, or screws (hereinafter also referred to as rivets, etc.). As a bar-like body or a board like body is buried along the peripheral edge of the cover, the rivets, etc. directly pierce the bar-like body or the board-like body, or, pierce the center side of portions, for example, a canopy portion rather than the bar-like body or the board-like body. Consequently, when force in the direction away from the attaching board is given to the cover in expanding, the force is first given to the net body, and then, is dispersed over the bar-like body or the board-like body connected with the net body. Accordingly, even when the cover is expanded, the cover is supported firmly by the attaching board such as a retainer. In addition, the bar-like body or the board-like body does not exist at the portion of the cover which is opened and deformed when the cover is expanded, and thus the cover is deformed so as to be opened promptly to the side.

DESCRIPTION OF THE PREFERRED EMBODIMENTS

Figure 1:
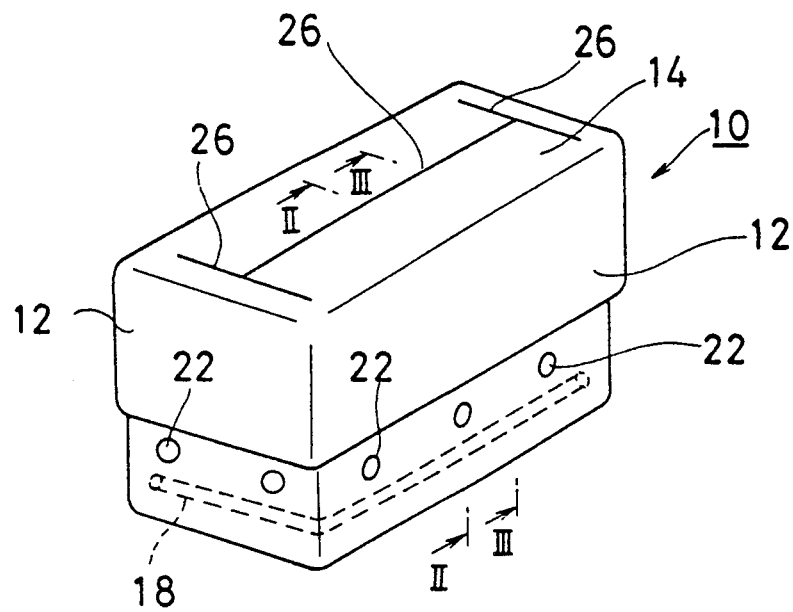
FIG. 1 is a perspective view of a cover of an air bag device of an embodiment of the present invention.
Figure 2:
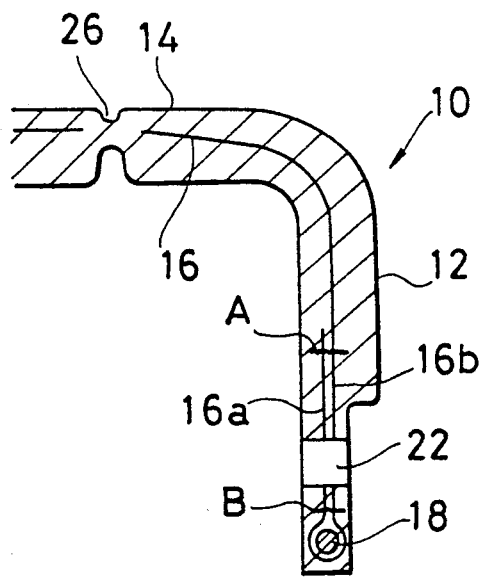
FIGS. 2 and 3 are partial sectional views of the cover.
Figure 3:
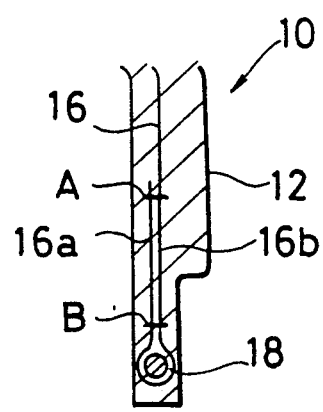
Figure 4:
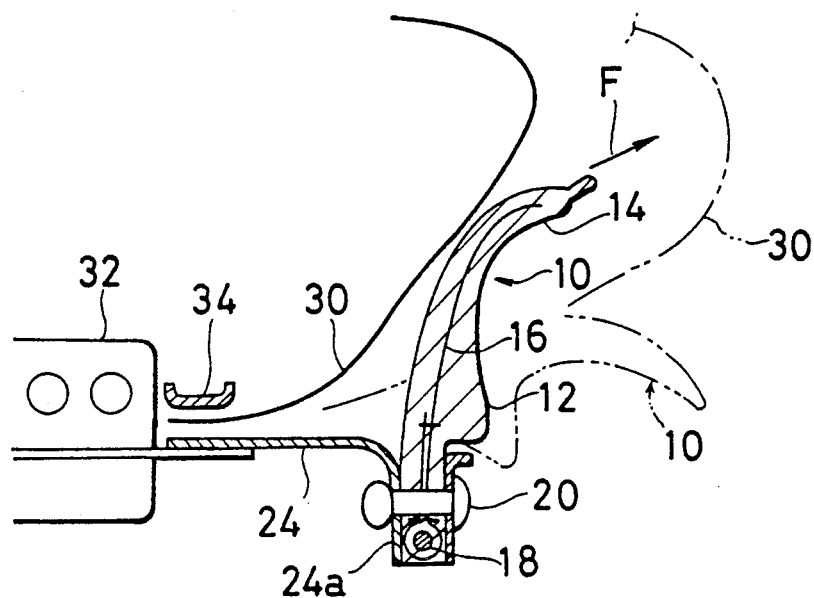
FIG. 4 is a sectional view of the cover when expanded.

FIG. 1 is a perspective view of a cover of an air bag device of an embodiment of the present invention. FIGS. 2 and 3 are sectional views taken along the line II—II and the line III—III, respectively, of FIG. 1. FIG. 4 is an explanatory view of deformation of the cover when expanded.

A cover 10 of the air bag device relates to a cover of an air bag device which is attached to a steering wheel. The cover 10 is a bottomless box-like shape with a lid and is provided with side wall portions 12 and canopy portion 14. A net body 16 for reinforcement is buried at the side wall portions 12 and the canopy portion 14. A bar-like body 18 is buried at the side wall portions 12 of the cover 10 so as to be extended along the peripheral edge portions of the side wall portion 12. The edge portions of the net body completely cover the bar-like body.

In the present embodiment, the edge portions of the net body (a net-like body made of synthetic fiber of high strength or metal) 16 returned up so as to wrap the bar-like body 18. The free-end side 16a which is turned up and the base-end side 16b of the net body 16 are combined with each other by sewing or adhering. Characters A and B designate the combined portions. In the present invention, the combined portion B is located adjacent to the bar-like body 18 and the combined portion A is located adjacent to the free end of the net body. Through holes 22 are bored for rivets, etc. 20 at the combined portions A and B. The side wall portion 12 overlaps side board portion 24a of a retainer 24 and is fixed by the rivets, etc. 20. An air bag 30 and an inflater 32 are attached to the retainer 24. 34 designates a ring for fixing the air bag 30.

In an air bag device comprising the cover 10 of the air bag device structured as abovementioned, when the air bag is expanded by gas blown off from the inflater, the cover 10 is torn along tear lines 26 of the canopy portion 14 as shown in FIG. 1. Further, as shown in alternate long and two short dashes lines of FIG. 4, the side wall portion 12 is opened and deformed so as to warp outward. When the cover is torn like this, force F in the direction away from the retainer 24 is given to the cover 10. The force F in the direction away from the container is dispersed all over the side wall portion 12 through the bar-like body 18. Particularly, in the present embodiment, the bar like body 18 is caught in rivets, etc. 20. Accordingly, even the great tensile force F is given to the cover 10, the side wall portion 12 of the cover 10 are firmly supported by the retainer 24. In addition, the bar-like body 18 does not exist at upper portion of the side wall portions 12 which are opened and deformed when the cover is torn (portions on the side of an occupant in respect to a board of the retainer 24) and thus the cover 10 is deformed so as to be opened promptly to the side.

Figure 5:
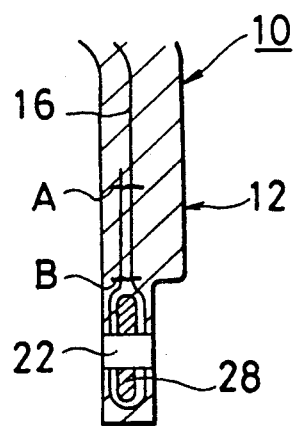
FIGS. 5, 6 and 7 are sectional views showing other embodiments.
Figure 6:
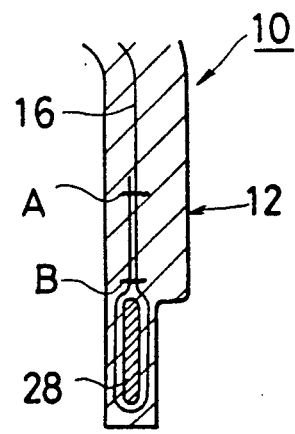

FIGS. 5 and 6 show other embodiments of the present invention and show structures of the same sectional portion as shown in FIGS. 2 and 3.

In the present embodiment, a board-like body 28 instead of the bar-like body 18 is buried. A through hole 22 for rivets etc. is bored so as to pierce the board-like body 28.

Figure 7:
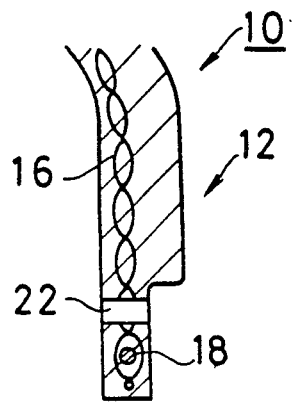
Figure 8:
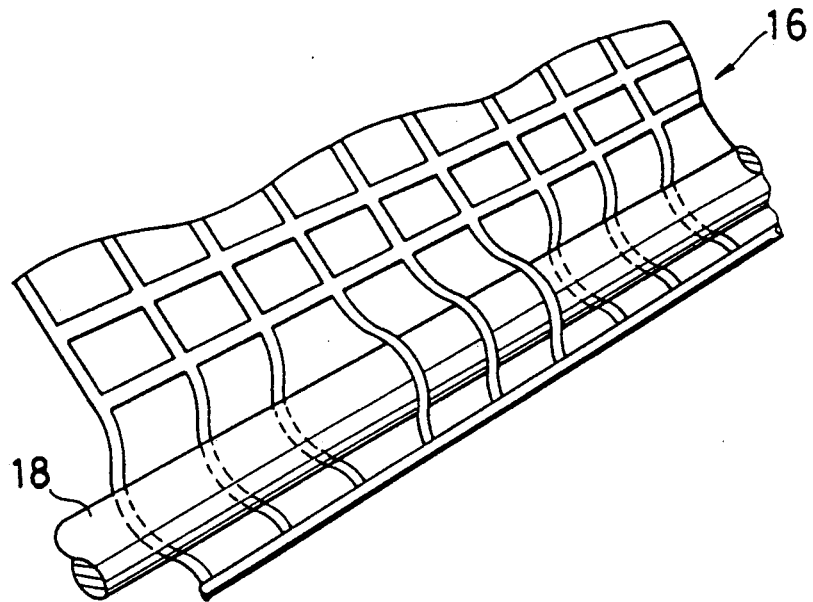
FIG. 8 is a perspective view showing an engagement of a net body and a bar-like body.

FIG. 7 is a sectional view showing still another embodiment of the present embodiment (showing the same sectional portion as shown in FIGS. 2 and 3). FIG. 8 is a perspective view for explaining a state of engagement of the bar-like body 18 and the net body 16.

In the present embodiment, the bar-like body 18 is wrapped by the peripheral edge portion of the net body 16 by passing through meshes of the peripheral edge portion of the net body 16 from one side to the other side.

The through hole 22 for rivets, etc. is bored on the side of the canopy portion 14 in respect to the bar-like body 18.

In the embodiments shown in FIGS. 5 through 8 also, when the cover is torn, the side wall portions 12 are firmly supported by the retainer, and in addition, the cover 10 is deformed so as to be opened promptly to the side.

The embodiments as abovementioned relate to a cover of an air bag device which is attached to a steering wheel. The present invention, however, can be applied also to other types of an air bag device, such as an air bag device which is provided at an instrumental panel.

What is claimed is:

1. A cover of an air bag device comprising:
   side wall portions and a canopy portion integrally formed together, said side wall portions forming side faces of the air bag device and having lower edge portions adapted to be fixed to an attaching board, said canopy portion forming an upper face of the air bag device,
   a net body for reinforcing said cover, said net body having free end sides and being embedded at least inside each side wall portion to extend from the lower edge portion,
   elongated members embedded inside the respective side wall portions, each elongated member being located at the lower edge portion to extend substantially an entire length of the lower edge portion and firmly engaging the net body as a whole, said net body extending each side wall and turning at the elongated member to enclose the elongated member therein, each free end side overlapping the net body and firmly attached thereto, and
   means for fixing the cover to the attaching board, said fixing means passing through the lower edge portions of the side wall portions so that at least parts of the net body and the elongated members are caught and located at sides opposite to the canopy portion, said side wall portions, when the air bag device is actuated, being securely fixed to that attaching board by the net body and the elongated members.

2. A cover of an air bag device according to claim 1, wherein said canopy portion includes at least one tear line, said cover being opened outwardly along the tear line when the air bag device is actuated, said net body extending from the side wall portion to the canopy portion without crossing the tear line.

3. A cover of an air bag device according to claim 1, wherein said elongated member is a bar extending at the lower edge portion, said fixing means passing through the side wall portion above the bar where the free end side is located.

4. A cover of an air bag device according to claim 1, wherein said elongated member is a board extending at the lower edge portion, said fixing means passing through the board and the free end side.

5. A cover of an air bag device, comprising:
   side wall portions and a canopy portion integrally formed together, said side wall portions forming side faces of the air bag device and having lower edge portions adapted to be fixed to an attaching board, said canopy portion forming an upper face of the air bag device and having at least one tear line therein,
   elongated board members embedded inside the respective side wall portions, each elongated board member being located at the lower edge portion,
   a net body for reinforcing said cover, said net body being embedded at least inside each side wall portion and having free end sides, said net body extending substantially through the side wall portion from the lower edge portion and being turned at the elongated board member to enclose the said therein so that each free end side overlaps the net body and being firmly connected together, and
   means for fixing the cover to the attaching board, said fixing means passing through the lower edge portions of the said wall portions and the elongated board member so that the net body and the elongated board members are caught and located at edges of the side wall portions, said side wall portions, when the air bag device is actuated, being securely fixed to the attaching board by the net body and the elongated member.

6. A cover of an air bag device according to claim 5, wherein each free end side and the net body are sewed together to enclose the elongated board member therein.

7. A cover on an air bag device according to claim 5, wherein a plurality of holes are formed in the side wall portions to pass through the net body and the elongated board members, said fixing means passing through the holes to firmly attach the side wall portions to the attaching board.

* * * * *